(12) United States Patent
Wachi

(10) Patent No.: US 6,215,588 B1
(45) Date of Patent: Apr. 10, 2001

(54) INFRARED MICROSCOPE

(75) Inventor: Tadashi Wachi, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 09/220,094

(22) Filed: Dec. 23, 1998

(51) Int. Cl.$^7$ ........................................... H04N 7/18
(52) U.S. Cl. ........................... 359/368; 382/293; 345/113
(58) Field of Search .................. 250/504 R; 359/368; 356/51; 382/293; 345/113, 127, 145

(56) References Cited

U.S. PATENT DOCUMENTS 5,754,335 * 5/1998 Takagi et al. .................... 359/368

* cited by examiner

*Primary Examiner*—Kiet T. Nguyen
(74) *Attorney, Agent, or Firm*—Coudert Brothers

(57) ABSTRACT

An infrared microscope has an aperture-forming part having a rectangular aperture with variable shape and size. A sample to be analyzed is photographed first and its image is displayed on a display screen. A virtual rectangular image is displayed on the same display screen superposingly on the image of the sample. The shape, size, position and orientation of this virtual rectangular image can be changed according to the positions of points on the display screen specified by a user through an input device such as a mouse. The shape, size, position and orientation of the aperture with respect to the sample are automatically changed so as to match those of the virtual rectangular image with respect to the image of the sample on the display screen.

4 Claims, 3 Drawing Sheets

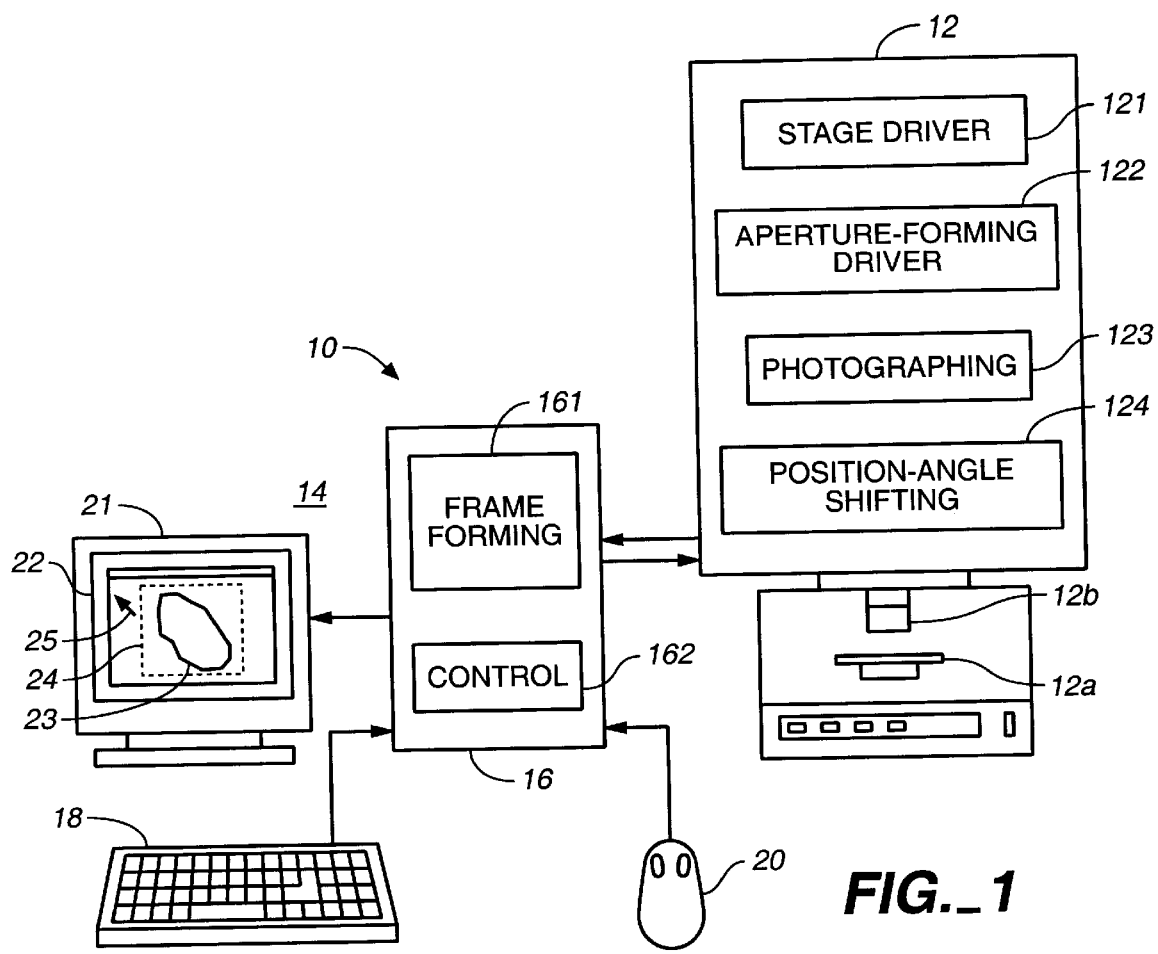
FIG._1

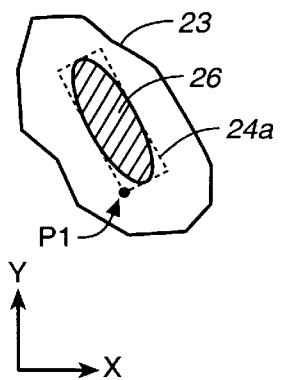
FIG._2A
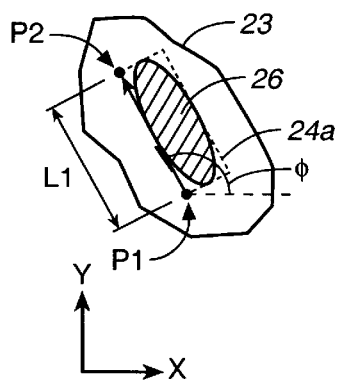
FIG._2B
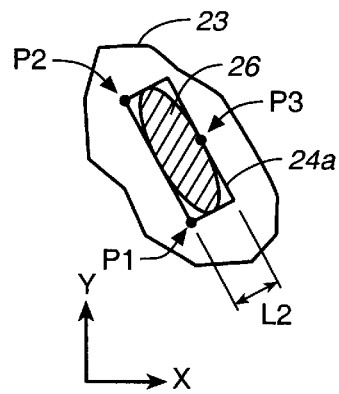
FIG._2C
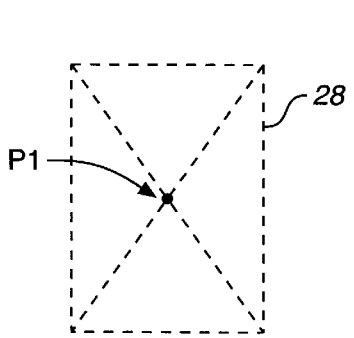
FIG._3A
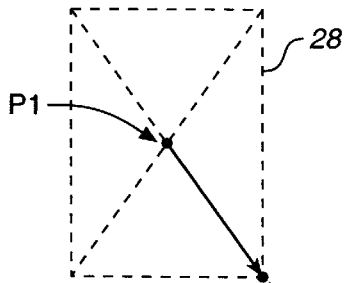
FIG._3B
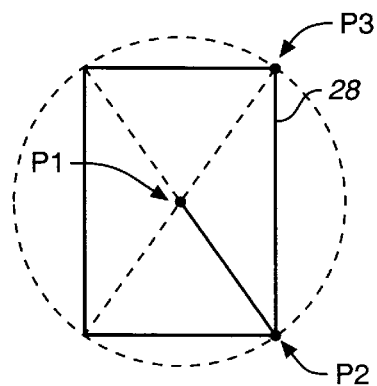
FIG._3C

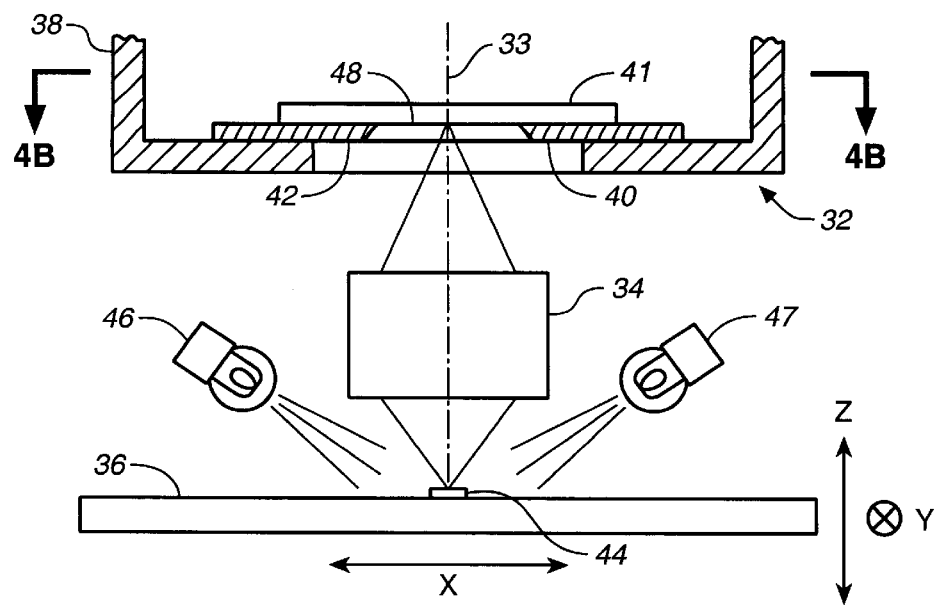
FIG._4A (PRIOR ART)
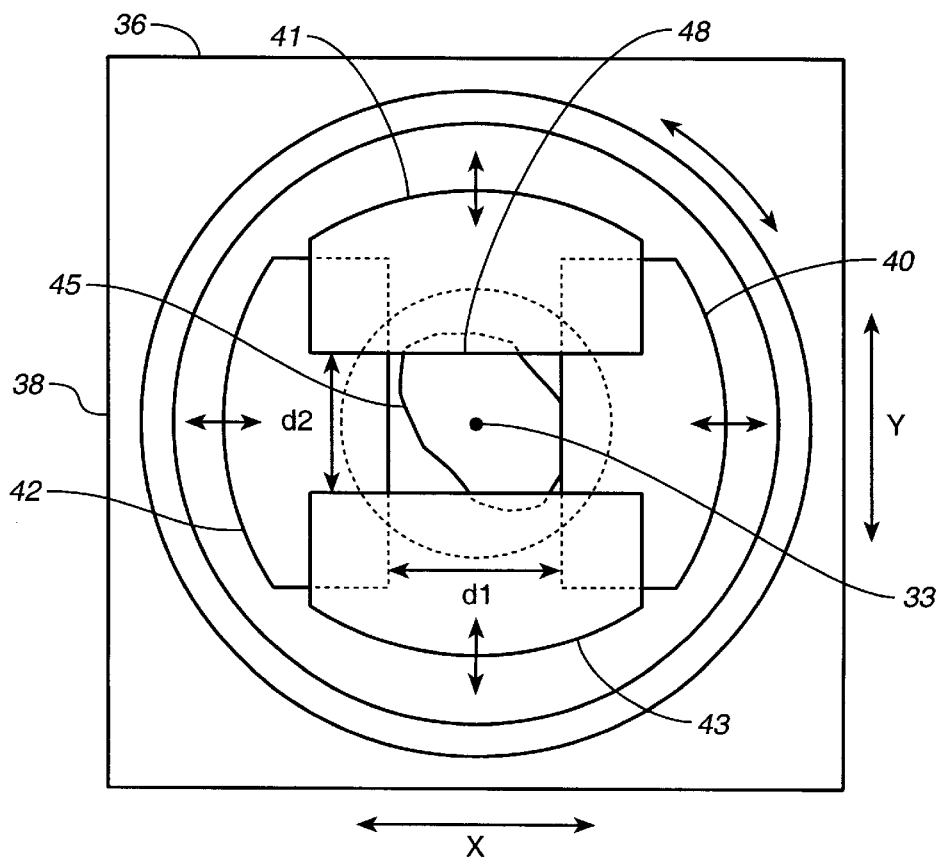
FIG._4B (PRIOR ART)

INFRARED MICROSCOPE

BACKGROUND OF THE INVENTION

This invention relates to an infrared microscope. More particularly, this invention relates to a mechanism including an aperture for an infrared microscope for limiting its field of view, or a surface area of a sample to be measured.

An infrared microscope is used to analyze a sample, exposed to an infrared light beam, based on the spectrum (or the intensity distribution according to the wavelength) of the reflected infrared light from the surface of the sample or the transmitted infrared light which has been transmitted through the sample. In such an analysis by using an infrared microscope, the size of the area which can be captured at once in its field of view is usually very small, being on the order of 100 μm–1 mm. At times, however, an analysis is carried out over even a smaller part of this already small area, for example, when attention is to be focused on a small impurity material which has been discovered within the field of view. Thus, an infrared microscope is usually provided with a mechanism including aperture plates or the like for limiting its field of view such that an analysis over a very small area or on a very small object on the surface of a sample can be carried out. Such a mechanism serves to limit the field of view appropriately such that only the light reflected from or transmitted through a reduced target area or object can be detected while the noise due to infrared light received from areas other than the target area can be cut and hence that a spectral analysis with high accuracy can be achieved.

A mechanism for limiting the field of view of an infrared microscope usually includes a plurality of planar members (herein referred to as "the aperture plates") for together forming an aperture for allowing only a part of infrared light received from a sample to pass therethrough and a driving mechanism for adjusting the positions and orientations of these aperture plates so as to conveniently change the shape and the size of the aperture. The driving mechanism serves to transmit the motion of a power source through screws and gears to the aperture plates as well as other components. The power source may be of a manual type requiring the user, say, to rotate a handle, or of an electrical type comprising pulse motors or linear motors.

FIGS. 4A and 4B show a portion of a prior art infrared microscope including its aperture-forming part 32, an optical system 34 and a sample stage 36, FIG. 4A being a partially sectional frontal (horizontal) view and FIG. 4B being a sectional plan view taken along line 4B—4B of FIG. 4A. Although not shown in FIGS. 4A and 4B, the sample stage 36 is provided with its own driving mechanism and can be thereby moved not only within a two-dimensional plane defined by the X-axis and the Y-axis but also in the direction of the height along the Z-axis shown in FIGS. 4A and 4B. The optical system 34 includes lenses and the like (not individually shown) and is disposed directly above the sample stage 36, and the aperture-forming part 32 is disposed directly above this optical system 34 such that its central axis coincides with the central axis 33 of the optical system 34.

The aperture-forming part 32 includes four aperture plates 40, 41, 42 and 43 and their holder 38 which is supported by the main body (not shown) of the infrared microscope so as to be rotatable around the aforementioned central axis 33. Of the four aperture plates 40, 41, 42 and 43, the plates 40 and 42 form a mutually opposite pair adapted to move slidingly along a straight line (along the X-axis), and the plates 41 and 43 form another mutually opposite pair adapted to move slidingly along another straight line (along the Y-axis) which is perpendicular to the direction of sliding motion of the plates 40 and 42. The driver for the aperture-forming part 32 is usually adapted to cause these pairs of aperture plates (40 with 42 and 41 with 43) to move in synchronism with each other and by same distances in mutually opposite directions.

When such an infrared microscope is used for the analysis of a sample, the sample is first placed as indicated by numeral 44 on the sample table 36 below the optical system 34 and a visible light source 46 is switched on. The position of the sample stage 36 along the Z-axis is adjusted until an enlarged image 45 of the sample 44 is formed on the focusing plane of the aperture-forming part 32 (that is, the contact surface between the upper and lower ones of the aperture plates 40, 41, 42 and 43). While observing this enlarged image 45 through an optical system for this purpose (not shown), the user operates the driver (not shown) for the aperture-forming part 32 to appropriately change the positions of the aperture plates 40, 41, 42 and 43 as well as the angle of rotation of the holder 38 and the position of the sample stage 36 within the X-Y plane such that unwanted portions of the enlarged image 45 of the sample 44 will be excluded from the open area of the aperture 48. After this adjustment is done, the visible light source 46 is switched off and an infrared light source 47 is switched on to carry out a spectral analysis of the infrared light reflected by the sample 44.

Most aperture-forming parts for an infrared microscope use four aperture plates with a straight edge to form a rectangular aperture, as shown in FIG. 4B. In such a case, the user adjusts the aperture usually in the following steps although they may not be carried out in the same sequence.

Firstly, the user operates the driver for the sample stage 36 in order to appropriately change the position of the sample stage 36 within the X-Y plane until the relative position (X, Y) of the aperture with respect to the sample is determined. Secondly, the user operates the driver for the aperture-forming part 32 in order to appropriately modify the angular position of the holder for the aperture plates with respect to the main body of the infrared microscope until the relative angular position of the aperture with respect to the sample is determined. Thirdly, the user operates the same driver to appropriately change the separations d1 and d2 (as shown in FIG. 4B) between the mutually opposite pairs of the aperture plates 40 with 42 and 41 with 43 until the lengths of the edges of the rectangular aperture are determined.

When these steps are carried out with a prior art infrared microscope of a typical kind, the user is required to set the position of the sample stage by operating switches for moving the X-axis and the Y-axis, to set the angular position of the holder by rotating a handle for the purpose and to operate on handles for varying the separations d1 and d2. In summary, these operations had to be carried out individually one at a time. If the size of the aperture is made smaller than that of the sample with a prior art infrared microscope of the type shown in FIGS. 4A and 4B, however, it becomes impossible to visually ascertain the whole image of a sample and hence the user had to be extremely careful in order to match the aperture with a target area for the measurement on the surface of the sample. If the user is inexperienced, in particular, the adjustment of aperture takes an unreasonably long time, and this affects the overall work efficiency of the analysis.

In view of the above, Japanese Patent Application 8-140952 described a new infrared microscope adapted to display a sample image taken by a photographing means on a screen of a display device, to generate a virtual image of an aperture on the basis of a signal corresponding to the actual opening of the aperture, and to display it superposed on the aforementioned sample image such that the user can easily ascertain on the display screen to which area on the sample surface the aperture corresponds.

SUMMARY OF THE INVENTION

It is an object of this invention to further improve the infrared microscope described in said Japanese Patent Application which will allow its user to set the aperture by still simpler operations at a position with a shape, size and angular orientation corresponding to a target area or object on the surface of a sample.

An infrared microscope embodying this invention, with which the above and other objects can be accomplished, may be characterized as comprising not only an aperture-forming part having a rectangular aperture and a driver for changing size and shape of this aperture but also means for shifting position and orientation of this aperture with respect to a sample to be analyzed, a camera or the like for causing an image of the sample to be displayed on a display screen, means for causing a virtual rectangular image to be displayed on the same display screen superposingly on the image of the sample and changing the shape, size, position and orientation of this virtual rectangular image according to the positions of points on the display screen specified by a user through an input device such as a mouse, and a control unit for causing the shape, size, position and orientation of the aperture with respect to the sample to match those of the virtual rectangular image with respect to the image of the sample on the display screen.

With an infrared microscope thus structured, the sample to be analyzed is photographed first so as to have its image displayed on the display screen. A virtual rectangle is also displayed on the same screen and the user operates a mouse of the like as input means to specify positions of a specified number (normally three) of points to thereby change the shape, size, position and orientation of this virtual rectangular image such that a portion of the image of the target of interest is completely enclosed inside.

After the virtual rectangle is displayed, the user can cause the shape, size, position and orientation of the real aperture with respect to the sample to be adjusted so as to match those of the virtual rectangular image with respect to the image of the sample on the display screen.

There are different methods for specifying the shape, size, position and orientation of a desired rectangular image by selecting positions of points on the display screen. The first position to be specified through the input device may be one of the corners or the center (or the intersection of the hypotenuses) of the virtual rectangular image. The second position to be specified may be respectively another corner adjacent to the initially selected corner or one of the corners of the virtual rectangular image.

BRIEF DESCRIPTION OF THE DRAWINGS:

The accompanying drawings, which are incorporated in and form a part of this specification, illustrate embodiments of the invention and, together with the description, serve to explain the principles of the invention. In the drawings:

FIG. 1 is a schematic structural diagram of an infrared microscope system embodying this invention;

FIGS. 2A, 2B and 2C show a method for specifying positions of three points to determine the shape, size, position and orientation of a rectangular image which will enclose a specified portion of interest of a sample displayed as a photographed image;

FIGS. 3A, 3B and 3C show another method for specifying positions of three points to determine the shape, size, position and orientation of a rectangular image which will enclose a specified portion of interest of a sample displayed as a photographed image; and FIG. 4A is a schematic partially sectional front view of a portion of a prior art infrared microscope, and FIG. 4B is a sectional view taken along line 4B—4B of FIG. 4A.

DETAILED DESCRIPTION OF THE INVENTION

FIG. 1 shows schematically the structure of an infrared microscope system 10 embodying this invention. Numeral 12 and 14 respectively indicate its infrared analyzer part and data processing part.

The infrared analyzer part 12 includes a light source part for exposing a sample to infrared and visible light (as shown at 46 and 47 in FIG. 4A), a sample stage 12a (shown also at 36 in FIG. 4A), a stage driver 121 for changing the position of this sample stage 12a, an aperture-forming part 12b (shown also at 32 in FIG. 4A) which includes a plurality of aperture plates (shown at 40, 41, 42 and 43 in FIGS. 4A and 4B) forming together a rectangular aperture (shown at 48 in FIGS. 4A and 4B) and a rotatable holder (shown at 38 in FIGS. 4A and 4B), an optical system (as shown at 34 in FIG. 4A) for focusing the light from the sample to form an image of the sample inside the aperture-forming part 12b, an electrical aperture-forming driver 122 including pulse motors or linear motors for mechanically driving constituents of the aperture-forming part 12b, and a photographing means 123 such as a CCD camera) for receiving light which has passed through the aperture-forming part 12b to thereby output an electric signal. For convenience of description and disclosure, some of these components are illustrated in FIG. 1 only schematically. The rotatable holder of the aperture-forming part 12b is combined with an electrically operated X-Y stage (not shown) which is movable within a two-dimensional plane to together form a means (herein referred to as "the position-angle shifting means" and schematically indicated by numeral 124) for changing the position and the orientation of the aperture with respect to the sample.

The data processing part 14 includes a central processing unit (CPU) 16 connected to the aforementioned infrared analyzer part 12, as well as input means including a keyboard 18 and a mouse 20, and a display device 21 with a screen 22 such as a CRT of an ordinary kind or a liquid crystal display, connected to the CPU 16. The CPU 16 is loaded with an appropriate program and, being connected also to the aforementioned driver 122 for the aperture-forming part 12b and the photographing means 123, serves also as frame-forming means 161 for displaying an image of an aperture on the screen 22 of the display device 21 and to change the position and orientation of this image of the aperture in response to an input by the user through the aforementioned input means, as well as control means 162 for controlling the aforementioned driver 122 for the aperture-forming part 12b and the aforementioned position-angle shifting means.

When using the system 10 as described above, the user first takes the picture of the sample with the photographing means 123. Electrical signals outputted from the photographing means 123 are converted into image signals by the CPU 16. These image signals are transmitted to the display device 21, causing an image of the sample ("the sample image 23") to be displayed on the screen 22.

Independently of the above, the CPU 16 (through its frame-forming means 161) causes a virtual rectangular aperture image (shown by dotted lines at 24) to be displayed on the screen 22 superposed on the sample image 23 of the sample on the sample stage 12a. As will be explained below in detail, the virtual aperture image 24 thus displayed on the screen 22 of the displayed device 21 does not represent the actual shape of the aperture currently formed in the aperture-forming part 12b. As the user operates the input means (such as the keyboard 18 or the mouse 20), the frame-forming means 161 serves to change the shape, size, position and orientation of the virtual aperture image 24 displayed on the screen 22 of the display device 21. In other words, the user can operate the keyboard 18 or the mouse 20 while observing the sample image 23 and the aperture image 24 displayed simultaneously superposed together on the screen 22 such that a desired portion of the sample image 23 will be contained inside the rectangular virtual aperture image 24 by properly setting its shape and size as well as its position and orientation with respect to the sample image 23. In FIG. 1, numeral 25 indicates a mouse cursor displayed on the screen 22 to aid the user in indicating (or specifying) a position on the screen 22 through the mouse 20 in a known manner. The vertical and horizontal directions of the screen 22 correspond to the X-direction and the Y-direction of the sample stage 12a shown in FIG. 4B.

The shape, size, position and orientation of a rectangular aperture image may be set by any of many methods. This may be done, for example, by specifying three points on the screen 22 through the input means and calculating the shape, size, position and orientation of the rectangular aperture on the basis of data indicating the positions of these three points on the screen 22. Explained more in detail, the position data of the three points, specified on the screen 22 where the aperture image 24 and the sample image 23 are displayed together superposed, are based upon by the frame-forming means 161 to electrically generate image signals for a new aperture image and to superpose these image signals onto the image signal outputted by the photographing means. As a result, a new rectangular aperture image is displayed on the screen 22, superposed to the sample image 23. In this manner, the user can cause a desired portion of the sample image 23 to be enclosed by a smaller virtual aperture image by properly specifying three points on the screen 22 by operating the input means.

Next, a method of selecting and calculating variables for specifying the shape, size, position and orientation of an aperture will be explained. In general, five variables are required to define the shape, size, position and orientation of a rectangle on a two-dimensional plane, including, say, two variables to determine the position of a reference point for the rectangle, a third variable for determining the direction of a reference line associated with the rectangle and two more variables for determining the shape and size of the rectangle. The aforementioned reference point of the rectangle may be one of its corners or the intersection of its two hypotenuses. If one of the corners of the rectangle is used as its reference point, the orientation of the rectangle may be defined as the angle made with the sample by one of the edges drawn from this corner. If the crossing point of the two hypotenuses is used as the reference point, the angle of one of the hypotenuses made with the sample may be selected as the orientation of the rectangle.

These variables can be set efficiently in three steps if the values of two variables are set in a first step on the basis of position data for a first point, the values of two other variables are set in a second step on the basis of the position data on the first two points and the value of the fifth variable is set on the basis of the position data of all three points in the third step.

Next, the invention will be described by way of practical examples. FIGS. 2A, 2B and 2C will be referenced first to explain one of the methods for forming on the screen 22 a rectangle 24a containing a specified portion 26 (shown shaded) of the sample image 23.

Firstly, one of the corners of the rectangle 24a is specified as the reference point P1 with coordinates (p1, q1) for drawing the rectangle 24a. Secondly, one of the adjoining corners of the rectangle 24a is specified as a second point P2, as shown in FIG. 2B. The length L1 of one of the sides of the rectangle 24a and its orientation (say, angle φ as shown in FIG. 2B) are thereby determined. Thirdly, a third point P3 is selected on the opposite side of the rectangle 24a, as shown in FIG. 2C, thereby determining also the length L2 of the adjoining side of the rectangle 24a, or all its data including its shape, size, position and orientation.

FIGS. 3A, 3B and 3C show another method for forming a rectangle 28, according to which the reference point P1 is selected at the intersection of its two hypotenuses. Secondly, one of the corners of the rectangle 28 is specified as a second point P2, as shown in FIG. 3B. Thirdly, a third point P3 to become one of the adjoining corners of the rectangle 28 is specified on the circle having P1 as its center and P2 on its circumference. The shape, size, position and orientation of the rectangle 28 are all uniquely determined thereby.

After the desired aperture image 24 is drawn on the screen 22 of the display device 21 by any of these methods, the user transmits to the CPU 16 a signal for indicating that the aperture has been set. This may be done, for example, by moving the mouse cursor 25 to the position of a button displayed on the screen 22 for this purpose and clicking thereon. Upon receiving this signal, the CPU 16, through its control means 162, outputs a signal to the stage driver 121 and the driver 122 for the aperture-forming part 12b such that the relative shape, size, position and orientation of the aperture formed in the aperture-forming part 12b with reference to the real sample will match the shape and size of, as well as the position and orientation with reference to the sample image 23, of the virtual aperture image 24.

Although the invention has been described above by way of only a limited number of examples, these examples are not intended to limit the scope of the invention. Many modifications and variations are possible within the scope of this invention. All such modifications and variations that may be apparent to a person skilled in the art are intended to be within the scope of this invention.

What is claimed is:

1. An infrared microscope comprising:

an aperture-forming part having a rectangular aperture with variable size and shape;

a driver for changing size and shape of said aperture;

position-angle shifting means for shifting position and orientation of said aperture with respect to a sample;

a display device for displaying an image;

photographing means for photographing said sample and thereby causing an image of said sample to be displayed on said display device;

input means for allowing a user to specify positions of points relative to said image of said sample displayed on said display device;

frame-forming means for causing a virtual rectangular image to be displayed on said display device superposingly on said image of said sample and changing shape, size, position and orientation of said virtual rectangular image according to the positions of points specified through said input means; and control means for controlling said driver and said position-angle shifting means so as to cause the shape, size, position and orientation of said aperture with respect to said sample to match the shape, size, position and orientation of said virtual rectangular image with respect to said image of said sample on said display device.

2. The infrared microscope of claim 1 wherein said aperture-forming part includes four movable planar members.

3. The infrared microscope of claim 1 wherein said frame-forming means serves to place one corner of said virtual rectangular image at a first position which is indicated through said input means and another corner adjacent said one corner at another position which is indicated at another time through said input means.

4. The infrared microscope of claim 1 wherein said frame-forming means serves to place the center of said virtual rectangular image at a first position which is indicated through said input means and one corner of said virtual rectangular image at another position which is indicated at another time through said input means.

* * * * *